(12) United States Patent
Sakamoto

(10) Patent No.: US 7,895,834 B2
(45) Date of Patent: Mar. 1, 2011

(54) HYDRAULIC STEPLESS TRANSMISSION

(75) Inventor: Kunihiko Sakamoto, Chikugo (JP)

(73) Assignee: Yanmar Co., Ltd., Osaka (JP)

( * ) Notice: Subject to any disclaimer, the term of this patent is extended or adjusted under 35 U.S.C. 154(b) by 450 days.

(21) Appl. No.: 12/066,933

(22) PCT Filed: Jan. 23, 2006

(86) PCT No.: PCT/JP2006/300952

§ 371 (c)(1),
(2), (4) Date: Mar. 14, 2008

(87) PCT Pub. No.: WO2007/034578

PCT Pub. Date: Mar. 29, 2007

(65) Prior Publication Data

US 2009/0100831 A1    Apr. 23, 2009

(30) Foreign Application Priority Data

Sep. 20, 2005   (JP) .............................. 2005-272788

(51) Int. Cl.
*F16H 61/42* (2010.01)
*B60K 17/10* (2006.01)
(52) U.S. Cl. ......................................... 60/492; 60/452
(58) Field of Classification Search .................... 60/431, 60/452, 491, 492
See application file for complete search history.

(56) References Cited

U.S. PATENT DOCUMENTS

| | | | | |
|---|---|---|---|---|
| 3,579,979 A | * | 5/1971 | Bosch et al. .................. | 60/431 |
| 4,779,417 A | * | 10/1988 | Kita ............................ | 60/430 |
| 5,095,698 A | * | 3/1992 | Deininger .................... | 60/452 |
| 5,184,466 A | * | 2/1993 | Schniederjan et al. ........ | 60/491 |
| 2004/0003590 A1 | * | 1/2004 | Kado et al. ................... | 60/431 |

FOREIGN PATENT DOCUMENTS

| | | | |
|---|---|---|---|
| EP | 1283365 A2 | * | 2/2003 |
| JP | 60-14654 | | 1/1985 |
| JP | 63-259180 | | 10/1988 |

(Continued)

OTHER PUBLICATIONS

International Search Report for International Application No. PCT/JP2006/300952, Japanese Patent Office, mailed Feb. 14, 2006, 2 pgs.

(Continued)

*Primary Examiner*—Thomas E Lazo
(74) *Attorney, Agent, or Firm*—Sterne, Kessler, Goldstein & Fox P.L.L.C.

(57) ABSTRACT

It is an object, in a hydraulic stepless transmission, to change capacity of a hydraulic pump to thereby make output characteristic different between forward and reverse travel and obtain efficient output characteristics. In the hydraulic stepless transmission formed of the hydraulic pump 10 and a variable displacement-type hydraulic motor 11 and including control means 4, 10 for carrying out capacity control based on a load received by the hydraulic stepless transmission, a pressure control valve 204 is connected to control pressure portions of the control means 4, 10 for carrying out the capacity control according to pressure in a hydraulic circuit 13 on a discharge side of the hydraulic pump 10 to carry out the capacity control of the variable pump and the motor 11.

4 Claims, 19 Drawing Sheets

FOREIGN PATENT DOCUMENTS

| | | |
|---|---|---|
| JP | 02-286963 | 11/1990 |
| JP | 04-171362 | 6/1992 |
| JP | 2004-11769 | 1/2004 |

OTHER PUBLICATIONS

Patent Abstracts of Japan, abstract of Publication No. JP 04-171362, Hydraulic Driving Device, published Jun. 18, 1992, (listed on accompanying PTO/SB/08A as document FP2).

Patent Abstracts of Japan, abstract of Publication No. JP 63-259180, Fluid Control Device, published Oct. 26, 1988, (listed on accompanying PTO/SB/08A as document FP3).

Patent Abstracts of Japan, abstract of Publication No. JP 02-286963, Variable Displacement Pump Controller of Hydraulic Drive Vehicle, (listed on accompanying PTO/SB/08A as document FP4).

Patent Abstracts of Japan, abstract of Publication No. JP 2004-011769, Hydrostatic Continuously Variable Transmission, (listed on accompanying PTO/SB/08A as document FP5).

Extended European Search Report for Application No. EP 06712168.1, dated Jun. 29, 2010, 5 pages.

* cited by examiner (a)

(b)

(a)

(b)

(c)

HYDRAULIC STEPLESS TRANSMISSION

BACKGROUND OF THE INVENTION

1. Technical Field

The present invention relates to a hydraulic stepless transmission and more particularly to a technique of controlling swash plate angles of movable swash plates of a hydraulic pump and/or a hydraulic motor forming the hydraulic stepless transmission.

2. Background Art

Conventionally, there is a known structure of a hydraulic stepless transmission (hereafter abbreviated as "HST") formed of a hydraulic pump and a hydraulic motor, in which a hydraulic servo mechanism controls tilting of movable swash plates of the hydraulic pump and the hydraulic motor to regulate capacities of variable displacement-type hydraulic pump and hydraulic motor. As a structure of the hydraulic servo mechanism, a mechanism (automotive control) in which a solenoid valve mounted to the hydraulic pump or the HST automatically tilts the movable swash plates in proportion to increase of a rotational speed of the hydraulic pump, a mechanism (manual servo control) in which a speed change operation lever mounted to an outer portion of the HST operates the movable swash plate of the hydraulic pump, and the like are known.

On the other hand, the HST having a mechanism (load control mechanism) for carrying out speed control in such manners as to reduce a traveling speed of a work vehicle when a load of an engine is a set value or greater, and to make the traveling speed a set speed when the load of the engine is the set value or smaller is known. To put it concretely, the movable swash plate of the HST (hydraulic pump) is shifted to a speed reducing side so that a work load does not exceed a predetermined value to thereby prevent stalling.

As the HST having such hydraulic servo mechanism and load control mechanism, there is an HST as disclosed in Patent Document 1, for example.

This HST includes a variable displacement-type hydraulic pump and two hydraulic motors operated by hydraulic oil of the hydraulic pump. At least one of the two hydraulic motors is a variable displacement-type hydraulic motor and an output combining mechanism for combining respective output rotations of the two hydraulic motors to result in a single output rotation is provided. With this structure, the output rotation of the variable displacement-type hydraulic motor is adjusted to substantially double output torque to increase the maximum torque in the HST.

The HST disclosed in the Patent Document 1 includes a hydraulic servo mechanism in which a speed changing valve switches a speed changing cylinder interlocked with a movable swash plate to tilt the movable swash plate in the hydraulic pump and the movable swash plate of the hydraulic motor can be tilted. With this structure, if load torque on the engine increases during work of the work vehicle at a slushy place or the like, the movable swash plate of the one hydraulic motor formed as the variable displacement-type motor is tilted to thereby increase low-speed torque to perform speed control of the work vehicle.

A prior-art structure of a hydraulic stepless transmission having a feedback circuit using a shuttle valve will be described.

FIG. 19 shows a hydraulic circuit of the prior-art hydraulic stepless transmission having the feedback circuit using the shuttle valve.

In the feedback circuit in the prior-art hydraulic stepless transmission, hydraulic oil is fed back to load control mechanisms 4, 4b and 104 as pressure in a main circuit connecting a hydraulic pump and a hydraulic motor via a shuttle valve 204c.

Patent Document 1: Japanese Patent Application Laid-open Publication No. 2004-11769

BRIEF SUMMARY OF THE INVENTION

Problems to be Solved by the Invention

In the HST disclosed in the above Patent Document 1, the above-described feedback of the pressure in the main circuit to the load control mechanisms can be electrically turned on and off and the pressure in the main circuit is always fed back to the load control mechanisms. Therefore it is difficult to make working pressure different between forward travel and reverse travel.

In the hydraulic stepless transmission having the feedback circuit using the shuttle valve, the pressure applied between the hydraulic pump and the hydraulic motor acts on the load control mechanisms and therefore the load control mechanisms are actuated in the same way for the hydraulic stepless transmission in forward travel and reverse travel. It is impossible to exert sufficient efficiency when different operations are carried out in forward travel and reverse travel by using work machines or in a structure in which a reverse-side pump capacity is smaller than a forward-side pump capacity.

Therefore, the invention relates to the hydraulic stepless transmission and solves the above prior-art problem. Objects of the invention are to easily make output characteristics different between forward and reverse travel and to obtain efficient output characteristics in the existing hydraulic stepless transmission.

Means for Solving the Problems

To solve the above problems, the present invention adopts the following means.

The invention is a hydraulic stepless transmission formed by connecting a hydraulic pump and a hydraulic motor by a hydraulic circuit, wherein at least one of the hydraulic pump and the hydraulic motor includes a hydraulic servo mechanism for carrying out capacity control of at least one of the hydraulic pump and the hydraulic motor and a load control mechanism for both forward and reverse travel and for controlling the hydraulic servo mechanism to a speed reducing side when pressure in the hydraulic circuit is high, feedback pressures are introduced into the load control mechanism from a first portion of the hydraulic circuit that is a discharge side of the hydraulic pump in forward travel and a second portion of the hydraulic circuit that is a discharge side of the hydraulic pump in reverse travel, and a pressure regulating valve is provided between the load control mechanism and the first portion or between the load control mechanism and the second portion to make the feedback pressure from the first portion and the feedback pressure from the second portion different.

In the invention, the pressure regulating valve is mounted from outside the hydraulic stepless transmission and includes a pressure regulating member to be able to regulate set pressure.

In the invention, the load control mechanism includes: a piston; a first oil chamber which is on one side of the piston, and into which the feedback pressure is introduced; a second oil chamber which is on the other side of the piston and into which back pressure is introduced; and a one-way throttle valve providing an oil path communicating with the second oil chamber to throttle discharge of hydraulic oil from the second oil chamber.

In the invention, the one-way throttle valve is of a cartridge type and the one-way throttle valve can be directly detached from outside the hydraulic stepless transmission.

Effects of the Invention

With the structure of the hydraulic stepless transmission according to the invention, it is possible to obtain different characteristics between forward travel and reverse travel in relation to capacity control of the hydraulic pump and/or hydraulic motor by the hydraulic servo mechanism.

The set pressure of the pressure regulating valve can be easily regulated by using a member such as a shim as a pressure regulating member and mounting the shim in a plug or the like forming the pressure regulating valve mounted to the oil path plate or the like of the hydraulic stepless transmission from outside and it is possible to achieve optimum load control of the hydraulic servo mechanism.

With the structure of the hydraulic stepless transmission according to the invention, it is possible to carry out flow rate control of the hydraulic oil around the piston, even if the piston of the load control mechanism has a small diameter.

With the structure of the hydraulic stepless transmission according to the invention, it is possible to improve maintainability of the load control mechanism.

DETAILED DESCRIPTION OF THE INVENTION

The present invention forms a hydraulic stepless transmission used for a work vehicle, in which a difference in discharge capacity is provided between a forward side and a reverse side and working pressure can be set for load control mechanisms in reverse travel so that engine performance can be exerted effectively.

Embodiment 1

<General Structure>

A work vehicle according to an embodiment of the invention will be described.

Figure 1:
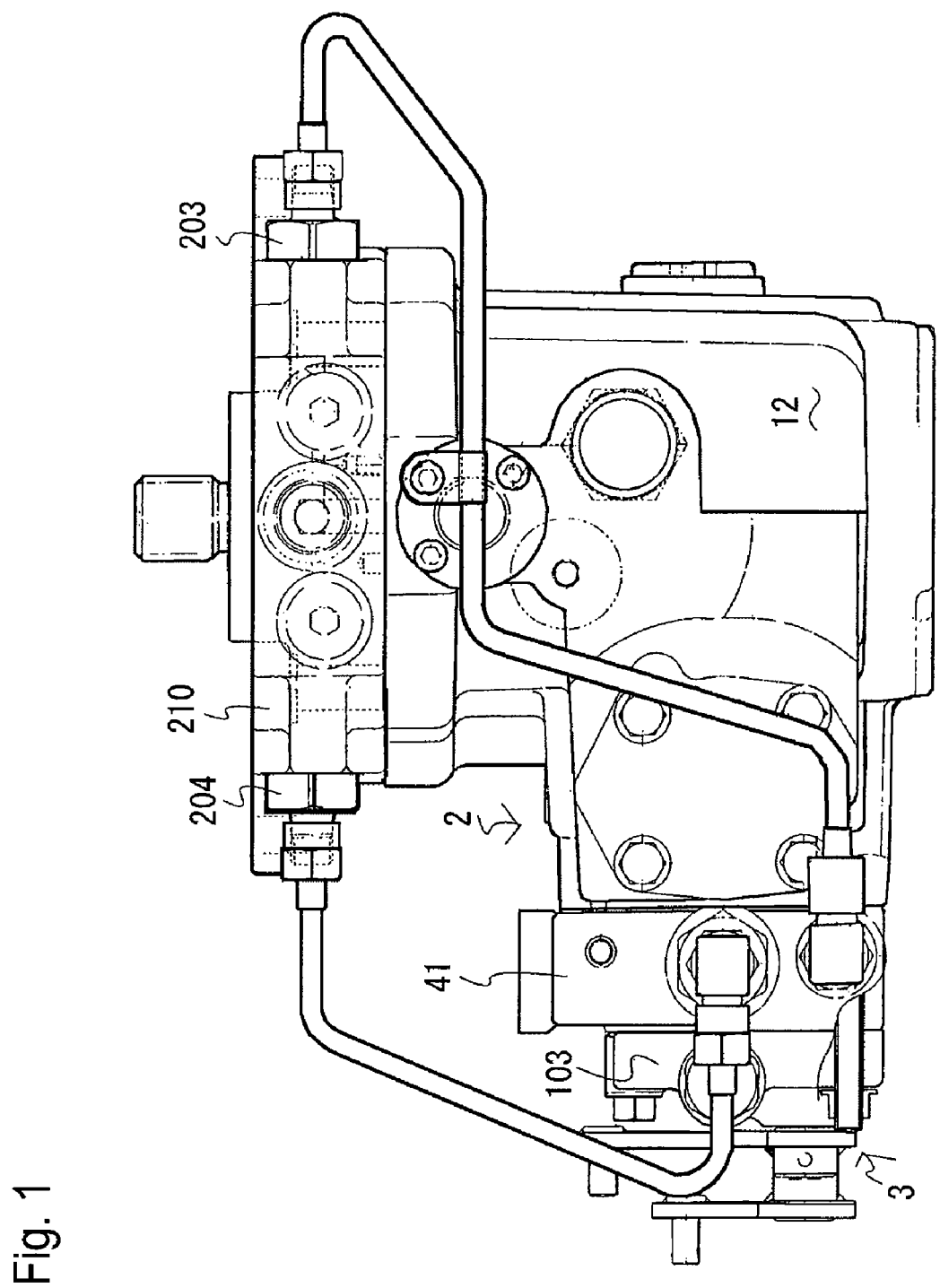
FIG. 1 is a bottom view of a hydraulic stepless transmission.

FIG. 1 is a bottom view of a hydraulic stepless transmission.

Figure 2:
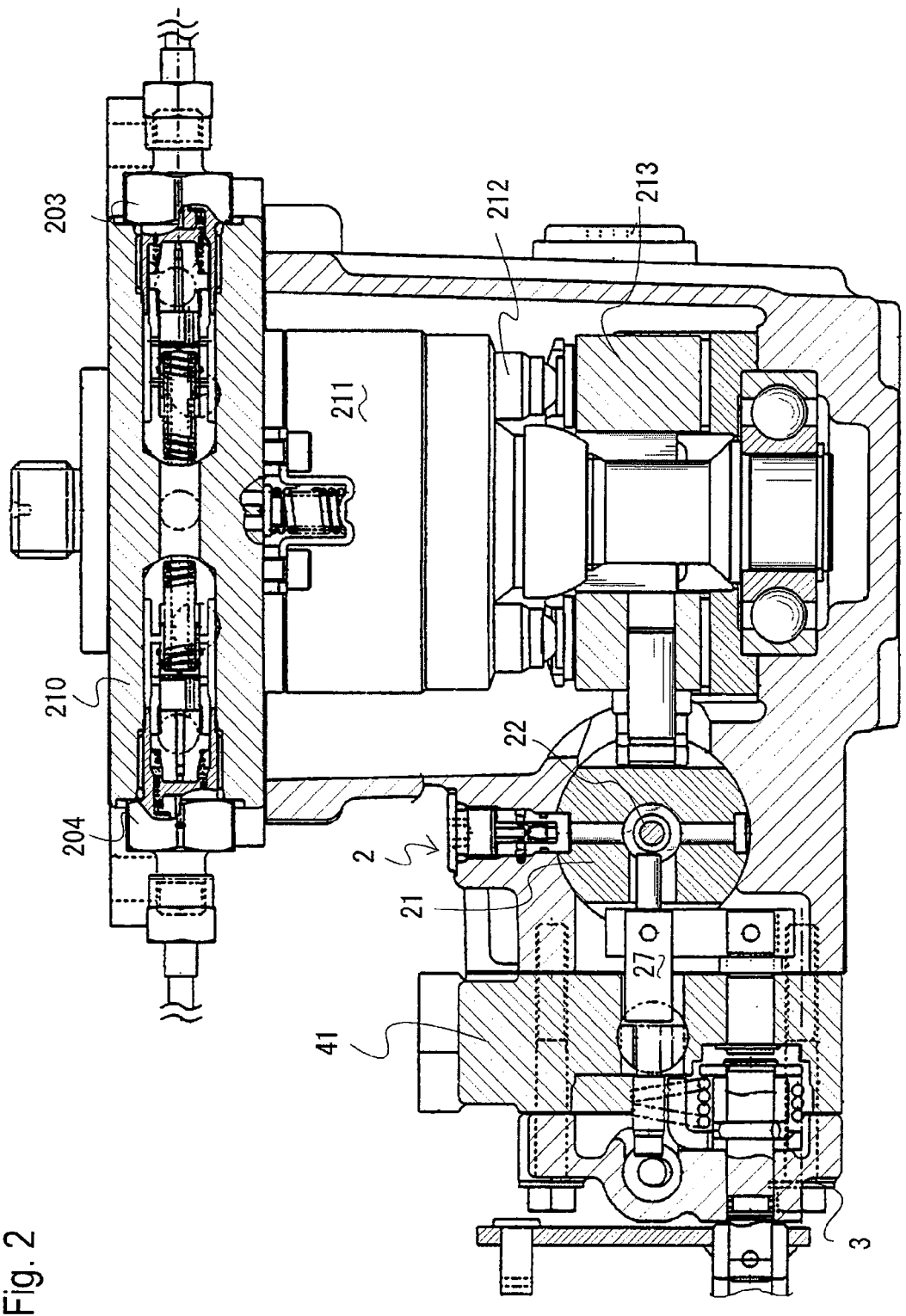
FIG. 2 is a partially-sectional bottom view of the hydraulic stepless transmission.

FIG. 2 is a partially-sectional bottom view of the hydraulic stepless transmission.

Figure 3:
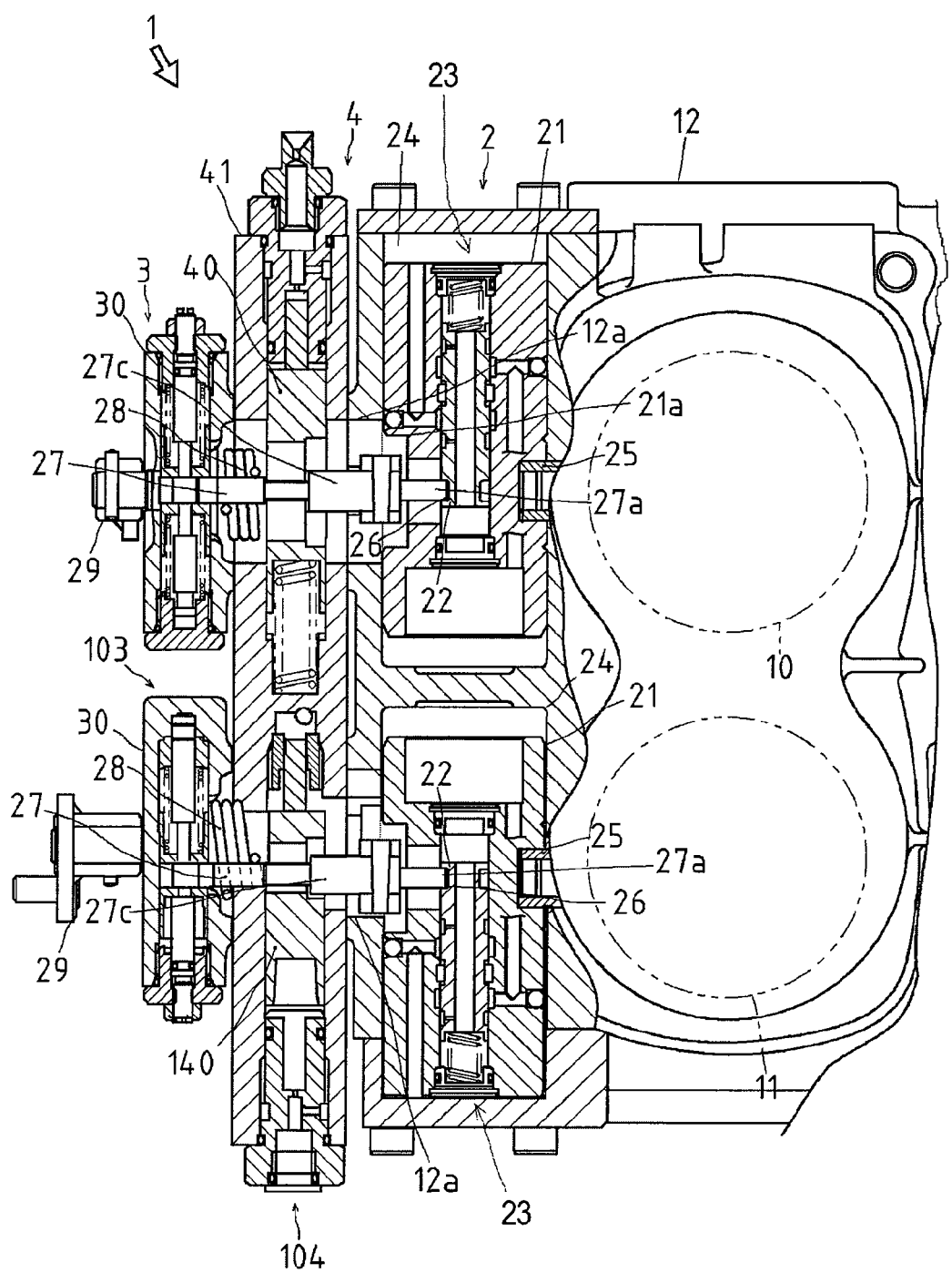
FIG. 3 is a partially-sectional front view showing an overall structure of the hydraulic stepless transmission.

FIG. 3 is a partially-sectional front view showing an overall structure of the hydraulic stepless transmission.

Figure 4:
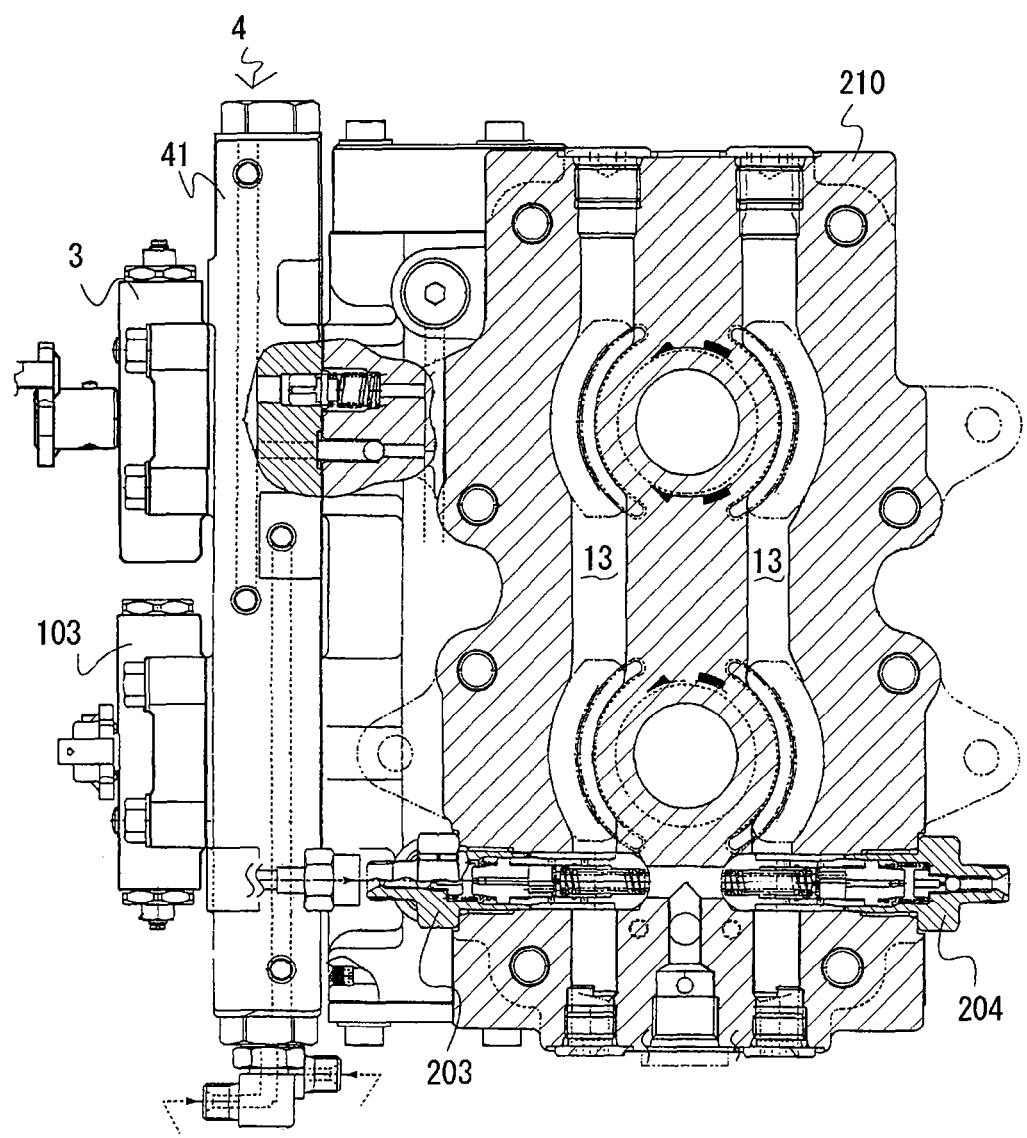
FIG. 4 is a partially-sectional front view showing a structure of an oil path plate in the hydraulic stepless transmission.

FIG. 4 is a partially-sectional front view showing a structure of an oil path plate in the hydraulic stepless transmission.

Figure 5:
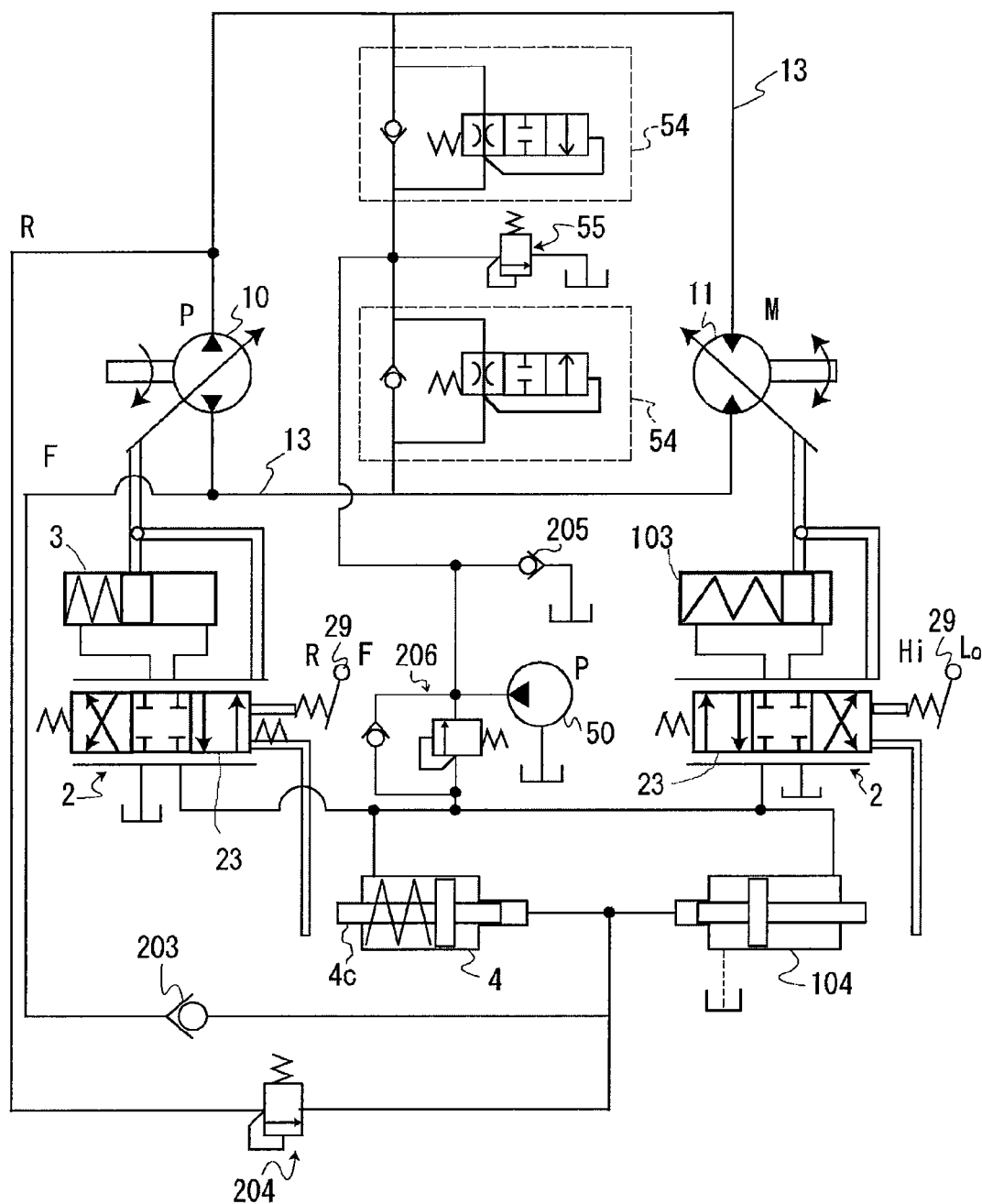
FIG. 5 is a hydraulic circuit diagram of the hydraulic stepless transmission.

FIG. 5 is a hydraulic circuit diagram of the hydraulic stepless transmission.

A hydraulic stepless transmission (hereafter abbreviated as "HST") 1 according to the present embodiment can be used for a work vehicle such as a tractor for farm work. In the following embodiment, a case in which the HST 1 is mounted on a work vehicle having a loader work machine will be described.

First, a general structure of the hydraulic stepless transmission according to the invention will be described below.

As shown in FIGS. 1 to 3, in the HST 1, a hydraulic pump 10 and a hydraulic motor 11 both of which are of a variable displacement type are enclosed in a housing 12. Besides them, provided in the housing 12 are hydraulic servo mechanisms 2 as mechanisms for regulating swash plate angles of movable swash plates of the hydraulic pump 10 and hydraulic motor 11 to control output rotations of the respective hydraulic pump 10 and hydraulic motor 11, a neutral position retaining mechanism 3 (maximum swash plate position retaining mechanism 103), load control mechanisms 4, 104, and the like. The hydraulic servo mechanisms 2, the neutral position retaining mechanism 3 (maximum swash plate position retaining mechanism 103), and load control mechanisms 4 and 104 are provided in pairs to the hydraulic pump 10 and hydraulic motor 11.

The hydraulic servo mechanism 2, the neutral position retaining mechanism 3, and the like of the hydraulic pump 10 will be described below unless otherwise specified. In the embodiment, these structures (the hydraulic servo mechanisms 2, the neutral position retaining mechanism 3 (maximum swash plate position retaining mechanism 103) disposed at the hydraulic pump 10 and hydraulic motor 11 are substantially the same structures.

Both of the hydraulic pump 10 and hydraulic motor 11 are of the variable displacement type in the embodiment. At least one of them may be of the variable displacement type and the other may be of a fixed displacement type.

Here, the variable displacement-type hydraulic pump 10 is formed of an input shaft, a cylinder block, a plunger, the movable swash plate in contact with the plunger, and the like. A head portion of the plunger is in contact or engaged with the movable swash plate to change a sliding amount of the movable swash plate to thereby adjust a discharge rate of hydraulic oil from the hydraulic pump 10. The variable displacement-type hydraulic motor 11 is formed of a cylinder block, a plunger, and a movable swash plate in contact with the plunger similarly to the variable displacement-type hydraulic pump 10. A head portion of the plunger is in contact or engaged with the movable swash plate to change a sliding amount of the movable swash plate to thereby adjust a suction rate of hydraulic oil to the hydraulic motor 11. The hydraulic pump 10 and hydraulic motor 11 are arranged side by side substantially parallel on the same face of an oil path plate 210 and hydraulic oil is supplied from the hydraulic pump 10 to the hydraulic motor 11 via a main circuit 13.

With this structure, driving force from an engine of the work vehicle is input to the input shaft to drive the hydraulic pump 10. The pressure oil discharged by the driving force of the hydraulic pump 10 is supplied to the hydraulic motor 11. The hydraulic motor 11 is driven by supply and discharge of the pressure oil and driving force of the hydraulic motor 11 is transmitted to an output shaft.

Next, the hydraulic servo mechanism 2 will be described.

As shown in FIG. 3, in the HST 1, the hydraulic pump 10 and the hydraulic motor 11 are arranged side by side in upper and lower positions. The hydraulic servo mechanism 2 for the hydraulic pump 10 is disposed on one side of the hydraulic pump 10 and the hydraulic servo mechanism 2 for the hydraulic motor 11 is similarly disposed on one side of the hydraulic motor 11 and below the hydraulic servo mechanism 2 for the hydraulic pump 10. Each hydraulic servo mechanism 2 is formed of a piston 21, a spool 22 disposed in the piston 21, and the like. The hydraulic servo mechanisms 2 are housed in the housing 12 of the HST 1 and respectively formed integrally.

The hydraulic servo mechanism 2 includes the piston 21 in which the spool 22 is mounted. To put it concretely, a cylinder chamber 24 is formed in the housing 12 and at a side portion of the movable swash plate of the hydraulic pump 10, the piston 21 is housed in the cylinder chamber 24, and a side face of the piston 21 and a side portion of the movable swash plate are connected by a sliding piece 25. A through hole is formed at a position of an axial center of the piston 21 and the spool 22 is slidably fitted in the through hole.

The piston 21 is formed with an oil path through which an upper portion and a lower portion of the cylinder chamber 24 communicate with each other in FIG. 3. By sliding of the spool 22, the oil path is opened or closed to send the pressure oil into oil chambers above and below the piston 21 to thereby cause the piston 21 to slide up and down.

A fitting groove 26 is formed at an outer periphery of a lower portion of the spool 22 and one end portion 27a of a pin 27 as a speed change drive member of the spool 22 is fitted in the fitting groove 26. The other end portion of the pin 27 is pinched by a torsion spring 28 forming the neutral position retaining mechanism 3 and the like which will be described later. The one end portion 27a of the pin 27 is inserted into the housing 12 through an opening 12a and an opening 21a open in side faces of the housing 12 and the piston 21 and is fitted in the fitting groove 26 as described above.

By turning a speed change lever 29 of the hydraulic servo mechanism 2 interlocked and coupled with the pin 27, the pin 27 moves in a vertical direction (vertical direction in FIG. 3) against a biasing force of the torsion spring 28 and the spool 22 moves in the vertical direction as the pin 27 moves. In this manner, by sliding the spool 22 of a manual swash plate angle control valve 23 to change the oil path to slide the piston 21, the movable swash plate (not shown) is tilted to change speed of the HST 1.

<Load Control Pressure Regulating Valve>

Next, by using a hydraulic circuit shown in FIG. 5, a load control structure of the HST will be described.

Discharge rate control of the hydraulic pump 10 is carried out by controlling the swash plate angle of the hydraulic pump 10 through the servo mechanism 2 on the left side in FIG. 5. The speed change lever 29 is connected to the servo mechanism 2 to operate the spool 22 of the servo mechanism 2. The speed change lever 29 shown on the left side in FIG. 5 is a forward and reverse operation lever, makes a switch between forward travel and reverse travel of the work vehicle, and adjusts the speed of the vehicle. The neutral position retaining mechanism 3 is connected to the hydraulic pump 10 to bias the swash plate of the hydraulic pump 10 to a neutral position. In the embodiment, the neutral position retaining mechanism 3 comes in contact with the speed change lever 29 to retain the swash plate of the hydraulic pump 10 in the neutral position with elasticity.

Furthermore, the hydraulic pump 10 is provided with the load control mechanism 4, and the load control mechanism 4 limits an amount of tilting of the swash plate according to the load on the hydraulic pump 10. The load control mechanism 4 limits an amount of movement of the spool 22 with a piston 40 disposed in a case 41 according to hydraulic pressure in the main circuit 13.

Discharge rate control of the hydraulic motor 11 is carried out by controlling a swash plate angle of the hydraulic motor 11 through the servo mechanism 2 on the right side in FIG. 5. The speed change lever 29 is connected to the servo mechanism 2 to operate the spool 22 of the servo mechanism 2. The speed change lever 29 shown on the right side in FIG. 5 is a speed change lever for the variable motor and increases and reduces a drive speed. The maximum swash plate position retaining mechanism 103 is provided to bias the swash plate of the hydraulic motor 11 to a maximum swash plate position. Moreover, the load control mechanism 104 limits an amount of tilting of the swash plate according to the load on the hydraulic motor 11. The load control mechanism 104 limits an amount of movement of the spool 22 with a piston 140 disposed in the case 41 according to the hydraulic pressure in the main circuit 13.

Each of the load control mechanisms 4 and 104 turns the swash plate of the hydraulic pump 10 or the swash plate of the hydraulic motor 11 in a speed reducing direction when at least a set pressure is applied on the main circuit 13.

A check valve 203 and a pressure regulating valve 204 are connected to the main circuit 13 connecting the hydraulic pump 10 and the hydraulic motor 11. The check valve 203 is connected to a side on which the hydraulic pump 10 pumps the hydraulic oil in forward travel and the pressure regulating valve 204 is connected to a side on which the hydraulic pump 10 pumps the oil in reverse travel. The pressure regulating valve 204 can set the pressure.

The hydraulic pump 10 is formed so that output of the hydraulic pump 10 is different between the forward side and the reverse side. In an embodiment, the discharge rate of the hydraulic oil on the forward side and the discharge rate of the hydraulic oil on the reverse side are different, i.e., the rate is lower on the reverse side than on the forward side.

Relief pressure of the main circuit 13 is carried out by a relief set 54, and a charge pump 50 supplies the hydraulic oil to the main circuit 13 to prevent a shortage of the hydraulic oil in the main circuit 13. A self-contained valve 205 is disposed between the charge pump 50 and an oil tank to prevent the main circuit 13 from becoming empty of the hydraulic oil when the engine is at a stop. Charge pressure of the hydraulic oil to the main circuit 13 is adjusted by a relief valve 55. The charge pump 50 supplies pilot pressure to the servo mechanisms 2 and the load control mechanisms 4, 104, and the hydraulic oil is supplied via a back pressure valve 206. The back pressure valve 206 prevents back-flow of the hydraulic oil and relieves surplus hydraulic oil.

The pressure regulating valve 204 is mounted to the oil path plate 210 from a side and connected to the main circuit 13. Therefore, it is easy to replace and adjust the pressure regulating valve 204.

The check valve 203 is connected to the load control mechanisms 4, 104 and supplies hydraulic oil to pilot pressure portions of the load control mechanisms 4, 104. The check valve 203 is connected to an oil path that is a discharge side when the hydraulic pump 10 is on the forward side and feed-back controls the load control mechanisms 4, 104 based on the hydraulic oil pressure in the main circuit 13 in forward travel.

The pressure regulating valve 204 connects the main circuit 13 and the load control mechanisms 4, 104 at a reverse-side oil path of the hydraulic pump 10 and carries out feedback control when pressure applied on the pressure regulating valve 204 reaches at least a set pressure. The pressure oil is supplied to the pilot pressure portions of the load control mechanisms 4, 104 via the check valve 203 in forward travel and via the pressure regulating valve 204 in reverse travel.

Because the feedback control is carried out via the pressure regulating valve 204 in reverse travel, the feedback control in reverse travel can be adjusted independently and it is possible to easily set according to usage of the work vehicle mounted with the transmission.

Figure 6:
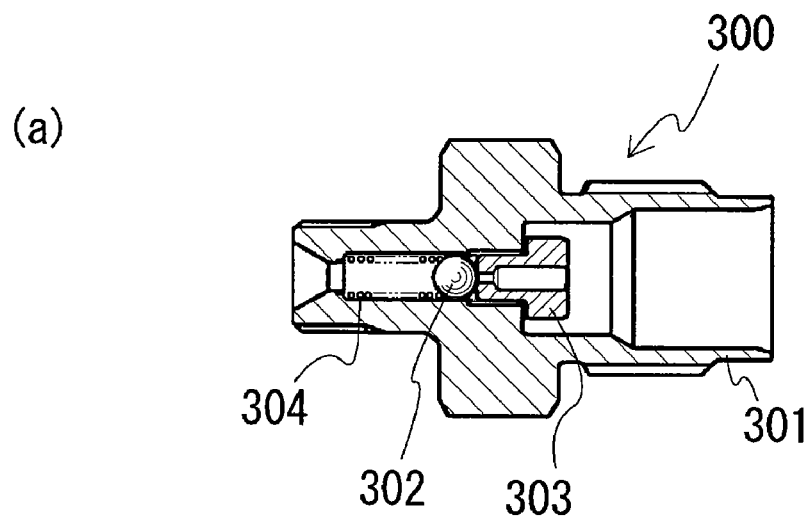
FIGS. 6(a) and 6(b) are drawings showing a structure of a pressure regulating valve.
Figure 6:
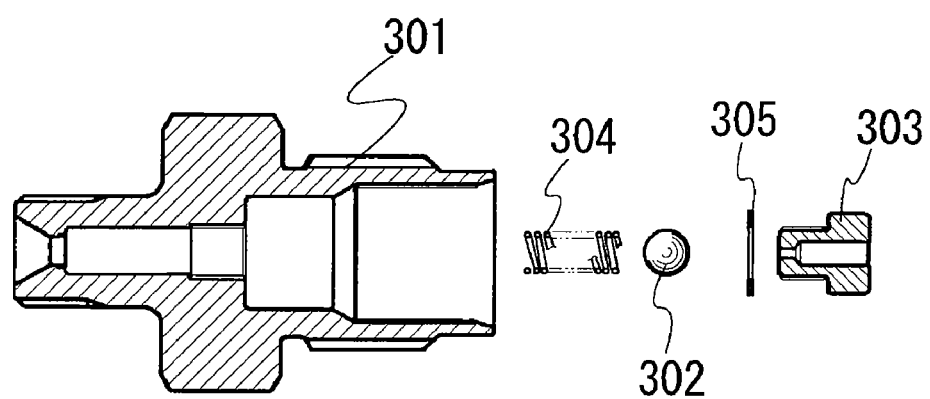

FIGS. 6(a) and 6(b) are drawings showing a structure of the pressure regulating valve FIG. 6(a) is a side sectional view of the pressure regulating valve and FIG. 6(b) is a sectional view showing assembly of the pressure regulating valve.

The structure of the valve used as the pressure regulating valve 204 will be described.

The valve 300 is a pressure regulating valve and is formed of a plug 301, a bolt 303, a hard ball 302, and a spring 304. By mounting the valve 300 to the oil path plate 210, the valve 300 is used as the pressure regulating valve. The valve 300 is formed by mounting the spring 304 in the plug 301 and the spring 304 biases the hard ball 302 toward an oil port of the bolt 303. The bolt 303 is mounted in the plug 301 by screwing and hydraulic oil introduced into the plug 301 is discharged through an oil path passing through the bolt 303. The hard ball 302 is in contact with the oil port on a hydraulic oil discharge side of the bolt 303.

Thus, when force of the hydraulic oil introduced into the bolt 303 and pushing the hard ball 302 becomes greater than force of the spring 304 pushing the hard ball, the oil port of the bolt 303 opens and the hydraulic oil is discharged from the plug 301 via the bolt 303. A shim 305 is disposed between the bolt 303 and the plug 301 to regulate the pressure.

In this way, the pressure regulating valve 204 can be replaced easily and the pressure in the valve 300 can be adjusted easily.

By forming the pressure regulating valve 204 as described above, it is possible to set the hydraulic oil pressure (load value) at which feedback starts to be given in reverse travel.

As a result, feedback control according to the characteristic of the hydraulic pump 10 can be carried out and working efficiency of the reverse-side operation of the work vehicle can be enhanced.

Figure 7:
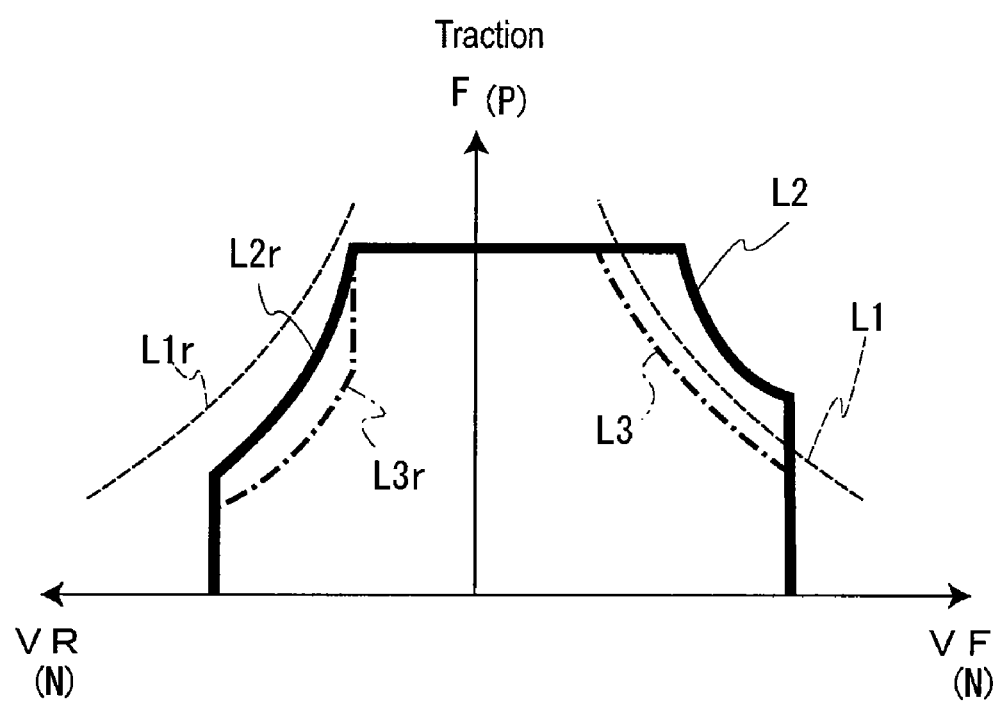
FIG. 7 is a graph showing a relationship between traction by the hydraulic stepless transmission and a vehicle speed in forward and reverse travel.

FIG. 7 is a graph showing a relationship between traction by the hydraulic stepless transmission and a vehicle speed in forward and reverse travel.

in FIG. 7, a dotted line L1 is a constant horsepower curve (engine stall curve), a thick line L2 is an HST relief curve, and a chain line L3 is a load control curve. By using the pressure regulating valve 204, it is possible to carry out the HST control according to the load control curve when a hydraulic pump having difference in capacity between forward travel and reverse travel is used.

The constant horsepower curve represents the relationship between the traction and the speed at a constant engine output. Above the constant horsepower curve, a load equal to or higher than the output is applied on the engine and the engine may stop in some cases. The HST relief curve represents the characteristic when the hydraulic oil is discharged by the relief valve to protect the HST. If excessive pressure is applied on the hydraulic oil, the hydraulic oil is relieved into a drain and part of the engine output is wasted.

The load control mechanisms 4, 104 are similarly used in forward travel and reverse travel. In the structure in which the pump capacity is smaller on the reverse side, a difference in working pressure is provided between forward travel and reverse travel to thereby efficiently utilize the engine output.

The pressure regulating valve 204 controls the pressure to the pilot pressure of the load control mechanisms 4, 104 in reverse travel to thereby carry out load control of the engine without going beyond the constant horsepower curve in the load control. In reverse travel, it is possible to carry out more efficient output control.

It is also possible to replace the check valve 203 connected to the forward side with a pressure regulating valve 203b to adjust a forward-side load control curve in the HST.

Figure 8:
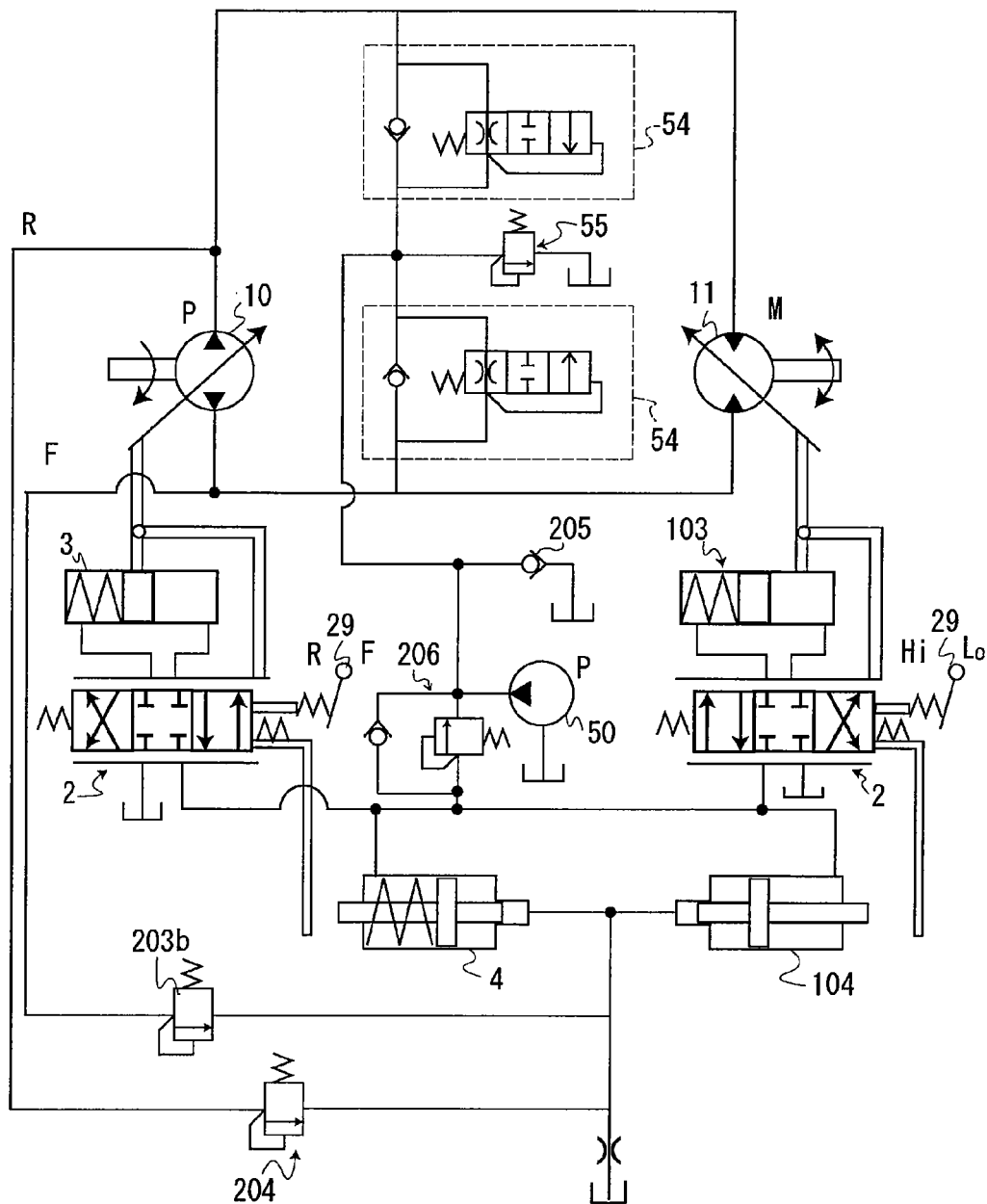
FIG. 8 is a hydraulic circuit diagram showing a structure in which pressure regulating valves are disposed on a forward side and a reverse side.

FIG. 8 is a hydraulic circuit diagram showing a structure in which the pressure regulating valves are disposed on the forward side and the reverse side.

Figure 9:
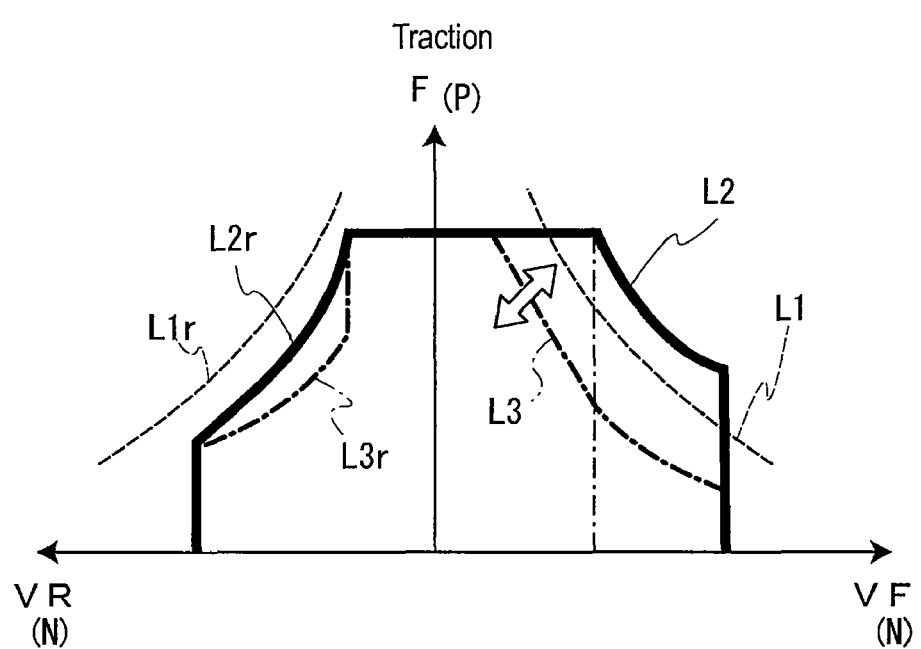
FIG. 9 is a graph showing a relationship between the traction and the vehicle speed in forward and reverse travel in the hydraulic circuit shown in FIG. 8.

FIG. 9 is a graph showing a relationship between the traction and the vehicle speed in forward and reverse travel in the hydraulic circuit shown in FIG. 8.

In FIG. 9, a dotted line L1 is a constant horsepower curve (engine stall curve), a thick line L2 is an HST relief curve, and a chain line L3 is a load control curve.

By using the pressure regulating valves 203b and 204, it is possible to carry out the HST control according to the load control curve when the hydraulic pump having difference in capacity between forward travel and reverse travel is used and the load control curve can be adjusted also on the forward side. In other words, a position of L3 can be adjusted by adjusting set pressure of the pressure regulating valve 203b. As a result, the load control can be carried out according to the constant horsepower curve, power distribution between travel and the work machine can be adjusted, and efficient operation can be carried out.

The power distribution between travel and the work machine can be adjusted according to the constant horsepower curve both in forward travel and in reverse travel.

By using the valve 300 used for the pressure regulating valve 204 also for the pressure regulating valve 203b, it is possible to easily regulate the pressure.

Embodiment 2

<General Structure>

Next, a second embodiment of the invention will be described.

Figure 10:
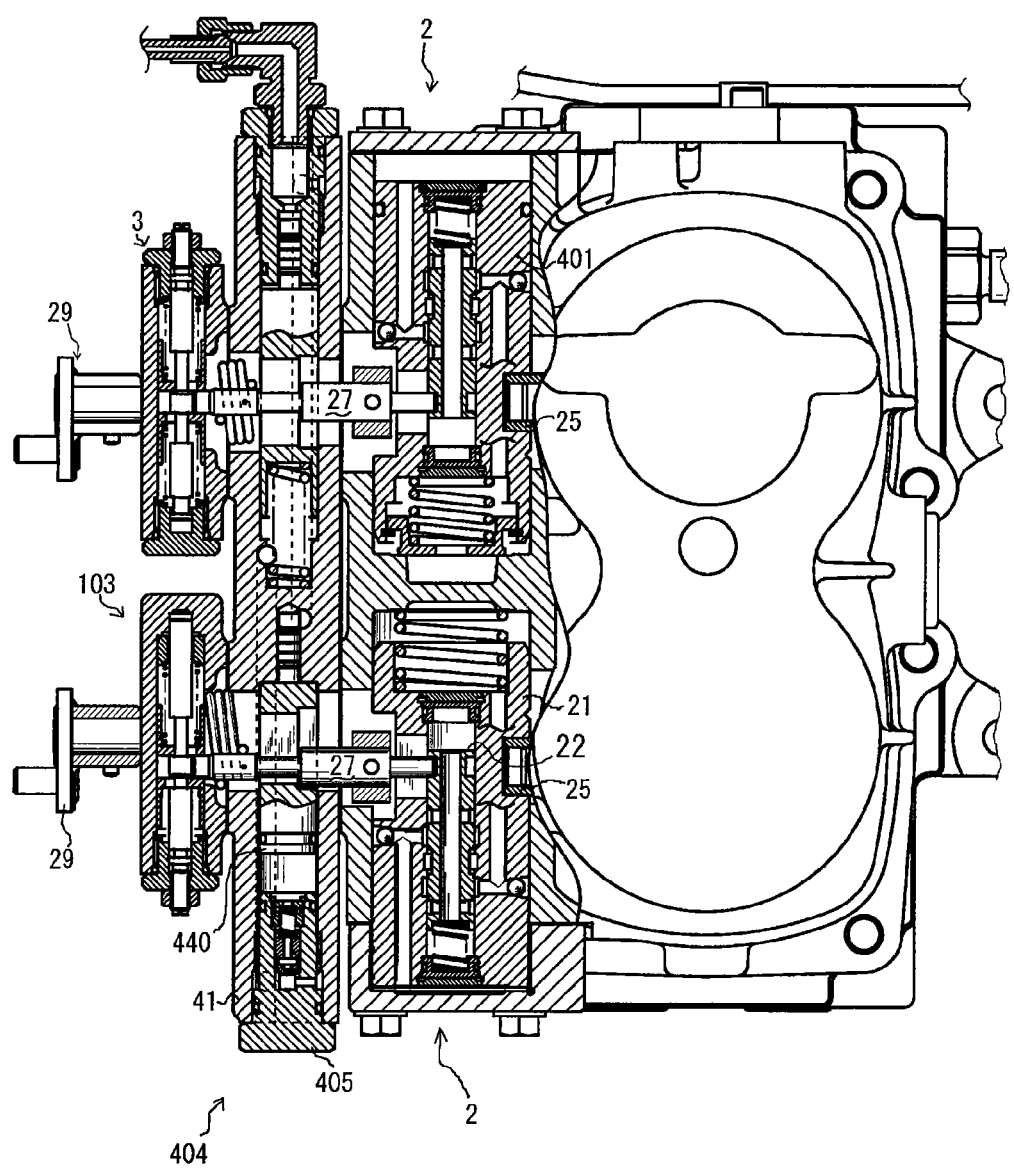
FIG. 10 is a partially-sectional front view showing an overall structure of a hydraulic stepless transmission in an embodiment 2.

FIG. 10 is a partially-sectional front view showing an overall structure of a hydraulic stepless transmission in embodiment 2.

First, a general structure of the hydraulic stepless transmission will be described.

As shown in FIG. 10, in the HST, a hydraulic pump and a hydraulic motor 11 both of which are of a variable displacement type are enclosed in a housing 12. The HST is provided with hydraulic servo mechanisms 2 as mechanisms for regulating swash plate angles of movable swash plates of the hydraulic pump 10 and hydraulic motor 11 to control outputs of the hydraulic pump 10 and hydraulic motor 11, a neutral position retaining mechanism 3 (maximum swash plate position retaining mechanism 103), load control mechanisms 4, 404, and the like.

Each of the hydraulic servo mechanisms 2 includes a piston 21 in which a spool 22 is mounted. The spool 22 is operated to drive the piston 21 with hydraulic pressure to thereby control a tilted position of the movable swash plate. A side portion of the piston 21 and the movable swash plate (not shown) are connected by a sliding piece 25.

A pin 27 interlocked with a speed change lever 29 is engaged with the spool 22 and the spool 22 is operated through the pin 27. Furthermore, the load control mechanism is also connected. The neutral position retaining mechanism 3 is connected to the load control mechanism for operating the hydraulic pump 10 and the maximum swash plate position retaining mechanism 103 is connected to the load control mechanism for operating the motor 11.

<Hydraulic Structure>

Next, a hydraulic structure of embodiment 2 will be described.

Figure 11:
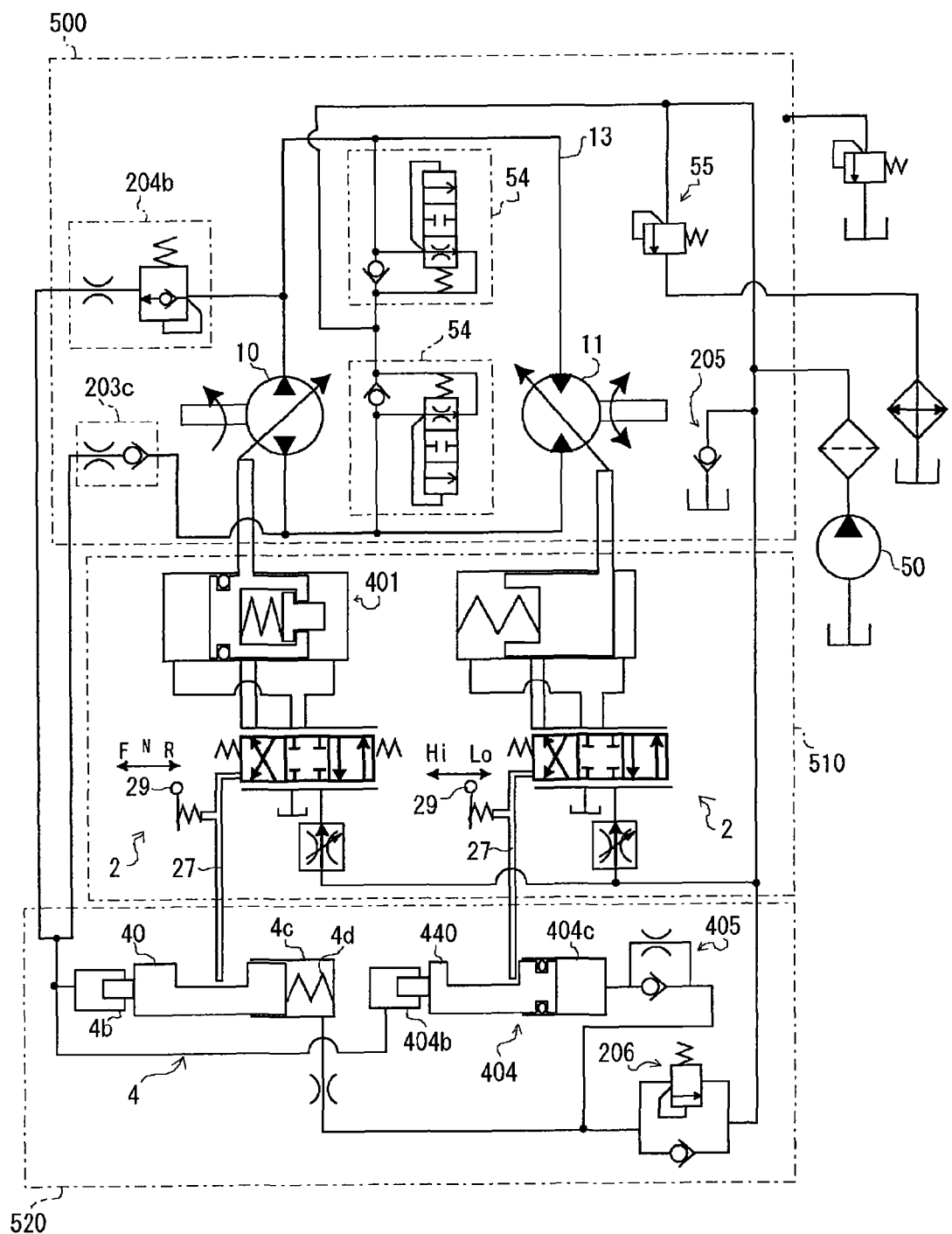
FIG. 11 is a diagram showing a hydraulic circuit of the embodiment 2.

FIG. 11 is a diagram showing a hydraulic circuit of embodiment 2. The hydraulic circuit of embodiment 2 is formed of an HST circuit 500, a servo circuit 510, and a load control circuit 520.

Discharge rate control of the hydraulic pump 10 is carried out by controlling the swash plate angle of the hydraulic pump 10 through the servo mechanism 2 on the left side in FIG. 11. The speed change lever 29 is connected to the servo mechanism 2 to operate the spool 22 of the servo mechanism 2. The speed change lever 29 shown on the left side in FIG. 11 is a forward and reverse operation lever, makes a switch between forward travel and reverse travel of the work vehicle, and adjusts the speed of the vehicle. Furthermore, the hydraulic pump 10 is provided with the load control mechanism 4. The load control mechanism 4 limits an amount of tilting of the swash plate according to the load on the hydraulic pump 10. The load control mechanism 4 limits turning of the speed change lever 29 according to hydraulic pressure in the main circuit 13.

Discharge rate control of the hydraulic motor 11 is carried out through the servo mechanism 2 on the right side in FIG. 11. The speed change lever 29 is connected to the servo mechanism 2 to operate the spool 22 of the servo mechanism 2. The speed change lever 29 shown on the right side in FIG. 11 is a speed change lever for the variable motor and increases and reduces a drive speed. Moreover, the load control mechanism 404 limits an amount of tilting of the swash plate according to the load on the hydraulic motor 11. The load control mechanism 404 limits operation of the speed change lever 29 with the piston 440 according to the hydraulic pressure in the main circuit 13.

Each of the load control mechanisms 4 and 404 turns the swash plate of the hydraulic pump 10 or the swash plate of the hydraulic motor 11 in a speed reducing direction when at least a set pressure is applied on the main circuit 13. A check valve 203c and a pressure regulating valve 204b are connected to the main circuit 13 connecting the hydraulic pump 10 and the hydraulic motor 11. The check valve 203c is connected to a side on which the hydraulic pump 10 pumps hydraulic oil in forward travel and the pressure regulating valve 204b is connected to a side on which the hydraulic pump 10 pumps hydraulic oil in reverse travel. The pressure regulating valve 204b can set the pressure.

The hydraulic pump 10 is formed so that output characteristics of the hydraulic pump 10 are different between the forward side and the reverse side. In an embodiment, the discharge rate of the hydraulic oil on the forward side and the discharge rate of the hydraulic oil on the reverse side are different, i.e., the rate is lower on the reverse side than on the forward side.

Relief pressure of the main circuit 13 is controlled by a relief set 54. A self-contained valve 205 is disposed between the charge pump 50 and an oil tank. Charge pressure of the hydraulic oil to the main circuit 13 is adjusted by a relief valve 55. The charge pump 50 supplies pilot pressure to the servo mechanisms 2 and the load control mechanisms 4, 404 and the hydraulic oil is supplied via a back pressure valve 206. The back pressure valve 206 prevents back-flow of the hydraulic oil and relieves surplus hydraulic oil. The pressure regulating valve 204b is mounted to the oil path plate 210 from a side and connected to the main circuit 13. Therefore, it is easy to replace and adjust the pressure regulating valve 204b.

In embodiment 2, the load control circuit 520 is formed of the load control mechanism 4 acting on the pump side and the load control mechanism 404 acting on the motor side.

The load control mechanism 4 is formed of an oil chamber 4b, an oil chamber 4c, a piston 40, and a spring 4d. The piston 40 has a small-diameter tip end inserted into the oil chamber 4b and a rear end inserted into the oil chamber 4c. In the oil chamber 4c, the piston 40 is biased by the spring 4d toward the oil chamber 4b. The oil chamber 4b is connected to the HST circuit 500 and hydraulic pressure is applied to the oil chamber 4b according to the pressure on the discharge side of the pump 10. Due to a difference between forces of the hydraulic pressure in the oil chamber 4b and the spring 4d, the piston 40 moves to act on the pump-operating servo mechanism 2 in the servo circuit 510 to reduce the load on the pump 10.

The load control mechanism 404 is formed of an oil chamber 404b, an oil chamber 404c, a piston 440, and a slow return valve 405. The piston 440 has a small-diameter tip end inserted into the oil chamber 404b and a rear end inserted into the oil chamber 404c. The oil chamber 404b is connected to the HST circuit 500 and hydraulic pressure is applied to the oil chamber 404b according to the pressure on the discharge side of the pump 10. Due to a difference between pressures in the oil chamber 404b and the oil chamber 404c, the piston 440 moves to act on the motor-operating servo mechanism 2 in the servo circuit 510 to reduce the load on the pump 10.

The slow return valve 405 is connected to the oil chamber 404c in which the rear end of the piston 440 is inserted. The slow return valve 405 is a one-way throttle valve and throttles back to limit a flow rate when the hydraulic oil in the oil chamber 404c is discharged through the slow return valve 405. When the hydraulic oil flows into the oil chamber 404c through the slow return valve 405, the flow rate of the hydraulic oil is not limited.

When the piston 440 acts toward the speed reducing side, the hydraulic oil in the oil chamber 404c is discharged. Therefore, the load control of the motor 11 toward the speed reducing side by the load control mechanism 404 can be carried out smoothly. In this way, it is possible to prevent hunting in the vehicle speed control.

The oil chamber 4c and the oil chamber 404c are connected to the back pressure valve 206 and supplied with the pilot pressure by the charge pump 50 via the back pressure valve 206.

Next, the load control mechanism 404 will be described more specifically.

Figure 12:
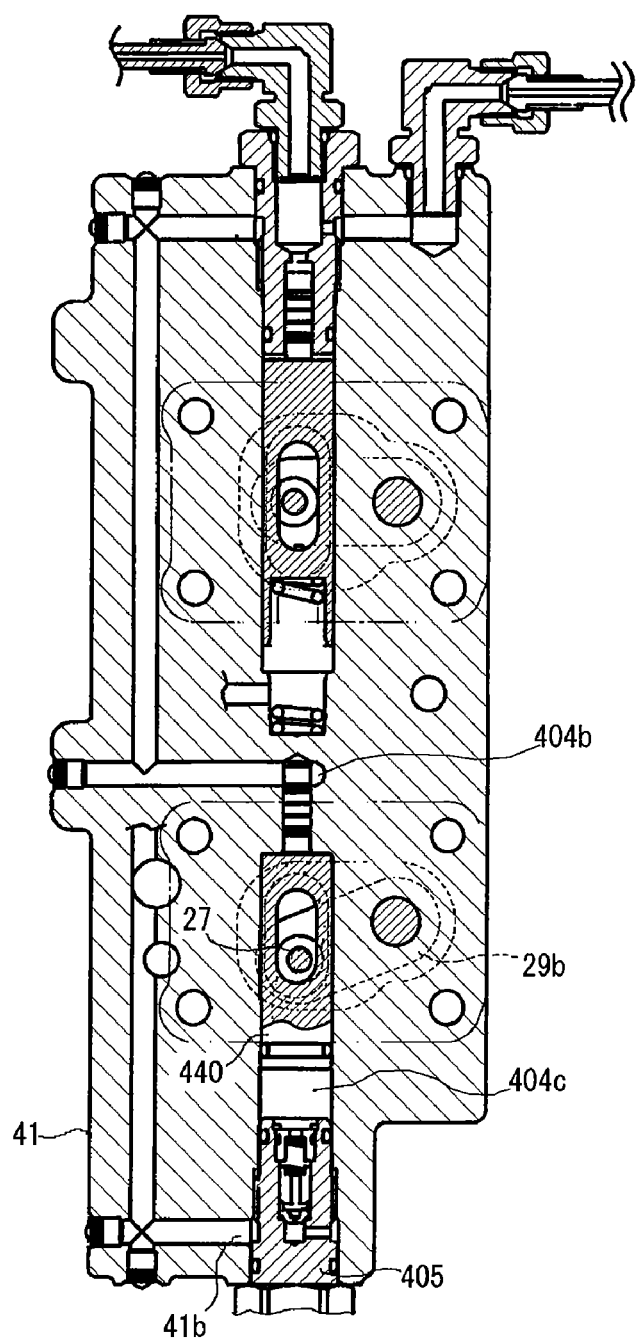
FIG. 12 is a side sectional view showing load control of a pump and a motor.
Figure 13:
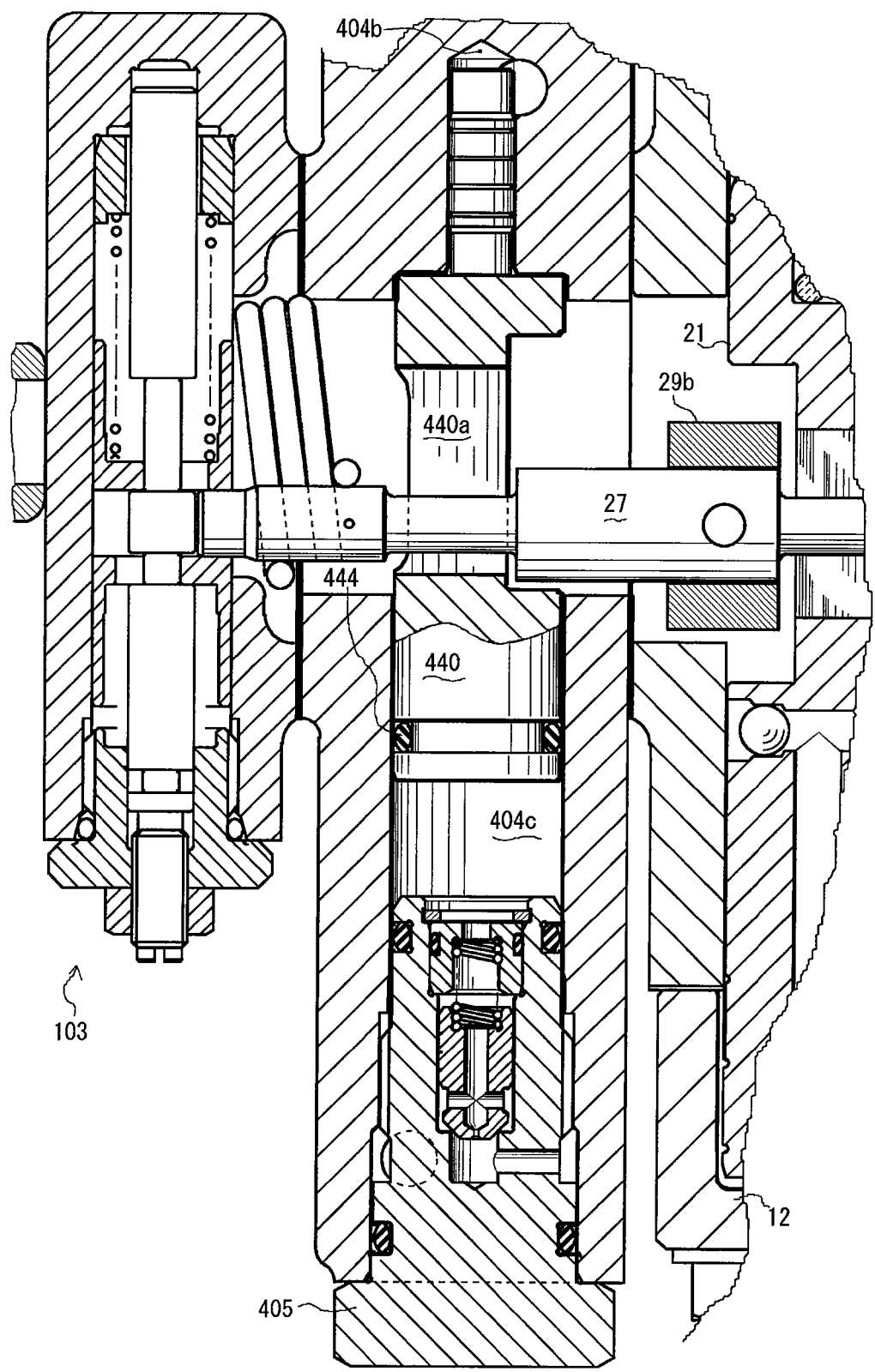
FIG. 13 is a front sectional view showing a load control mechanism of the motor.

FIG. 12 is a side sectional view showing the load control of the pump and the motor. FIG. 13 is a front sectional view showing a load control mechanism of the motor.

The oil chamber 404b, the oil chamber 404c, the piston 440, and the slow return valve 405 forming the load control mechanism 404 are disposed in a case 41. The case 41 is provided with the oil chamber 404b and the oil chamber 404c and mounted with the piston 440 and the slow return valve 405.

An arm 29b connected to the speed change lever 29 is rotatably attached to the case 41. The pin 27 attached to the arm 29b is inserted into an opening portion formed at a middle portion of the piston 440. The piston 440 can slide with respect to the case 41 and slides due to the difference between the pressures in the oil chamber 404b and the oil chamber 404c. The piston 440 comes in contact with the pin 27 to thereby adjust the position of the pin 27 for controlling the servo mechanism of the swash plate.

Along the sliding direction of the piston 440, the oil chamber 404b, the oil chamber 404c, and the slow return valve 405 are disposed. The slow return valve 405 is attached from outside the case 41 by screwing. The slow return valve 405 is disposed between the oil chamber 404c and an oil path 41b in the case 41 and the oil path 41b is an oil path for supplying the pilot pressure.

The tip end portion of the piston 440 inserted into the oil chamber 404b has a smaller diameter than the rear end portion inserted into the oil chamber 404c. An O ring 444 is mounted to the rear end portion of the piston 440 so that the hydraulic oil in the oil chamber 404c can pass through the slow return valve 405 without leaking.

Figure 14:
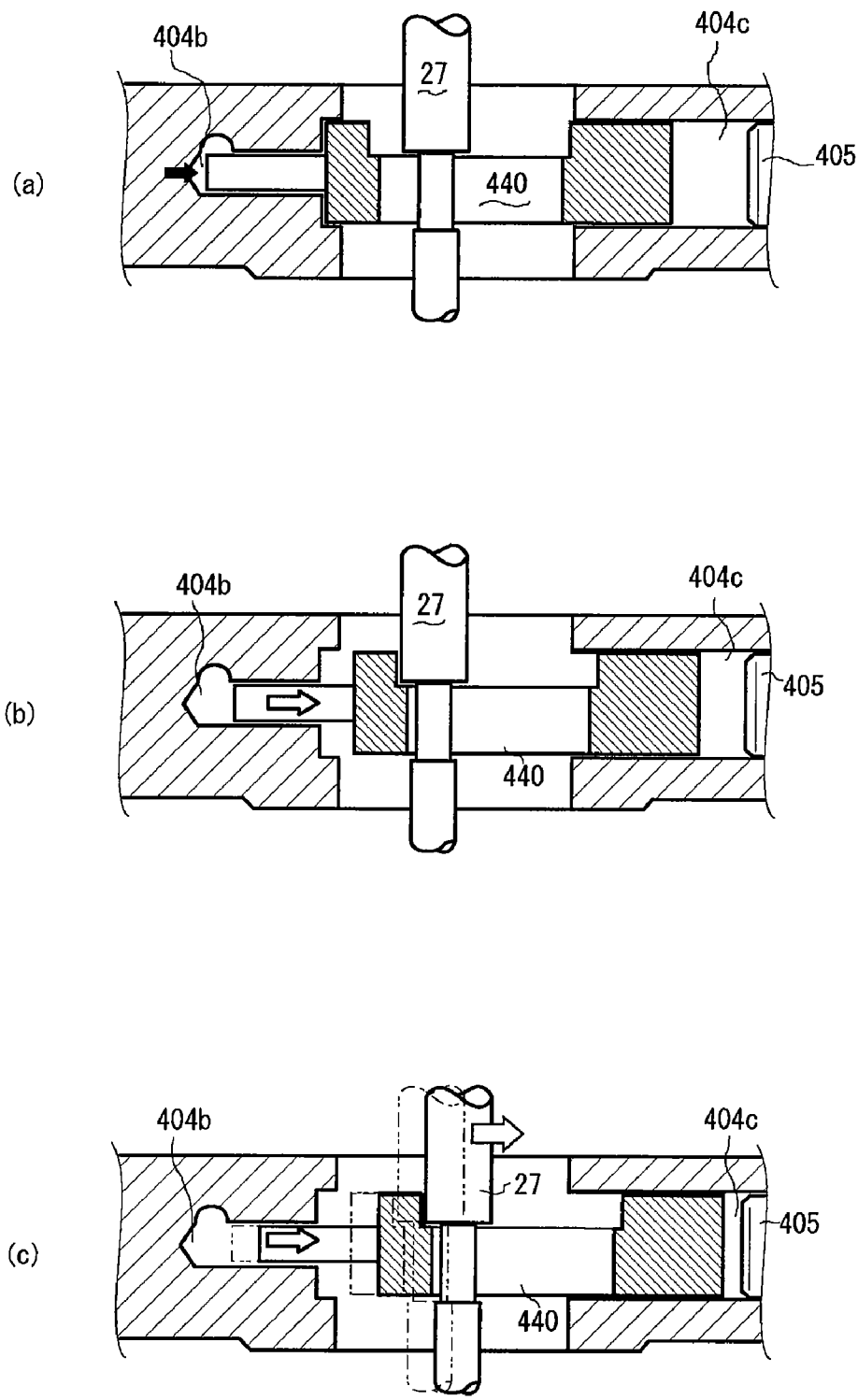
FIGS. 14(a) to 14(c) are schematic diagrams showing adjustment of a position of a pin by a piston.

Next, a structure of adjustment of the position of the pin 27 by the piston 440 will be described by using FIGS. 14(a) to 14(c). FIGS. 14(a) to 14(c) are schematic diagrams showing adjustment of the position of the pin by the piston.

When the hydraulic pressure in the oil chamber 404b increases due to an increase in the load of the HST from a state shown in FIG. 14(a), the piston 440 moves in such a direction as to withdraw from the oil chamber 404b. As the piston 440 moves, the hydraulic oil in the oil chamber 404c is pushed out into the slow return valve 405. Then, as shown in FIG. 14(b), the pin 27 comes in contact with an inner face of an elongated hole of the piston 440. When the piston 440 further moves in such a direction as to withdraw from the oil chamber 404b, the position of the pin 27 is adjusted toward the motor maximum swash plate position. The position of the piston 440 limits a moving range of the pin 27.

If the piston 440 moves in such a direction as to withdraw from the oil chamber 404b, rapid movement of the piston 440 is suppressed by throttling of the slow return valve 405. In this way, rapid load control is suppressed.

The structure of the large-diameter portion of the piston 440 will be described.

FIGS. 15(a) to 15(d) are drawings showing a large-diameter portion of the piston. FIG. 15(a) is a perspective view, FIG. 15(b) is a side view, FIG. 15(c) is a plan view, and FIG. 15(d) is a front view.

In the piston 440, the contact face 440b that comes in contact with the pin 27 in adjusting the pin 27 to the maximum swash plate position is positioned closer to a delay side (oil chamber 404b side) from a normal position. By positioning the contact face 440b on the delay side, the position of the pin 27 can be adjusted in the state in which rapid movement of the piston 440 is suppressed, i.e., the state in which the slow return valve 405 is actuated and effective.

Because the load control mechanism 404 is formed to be compact and small, in a process of flowing of the hydraulic oil into the throttle of the slow return valve 405 as the piston 440 is inserted into the oil chamber 404c, a certain degree of flow rate is required to make the throttle sufficiently effective. Here, by the time the throttle becomes sufficiently effective, the piston 440 may move rapidly. Therefore, the throttle of the slow return valve 405 is made effective so that behavior of the piston 440 becomes sufficiently stable from a state in which the piston 440 is in the closest position to the oil chamber 404b until the piston 440 comes into contact with the pin 27.

Figure 15:
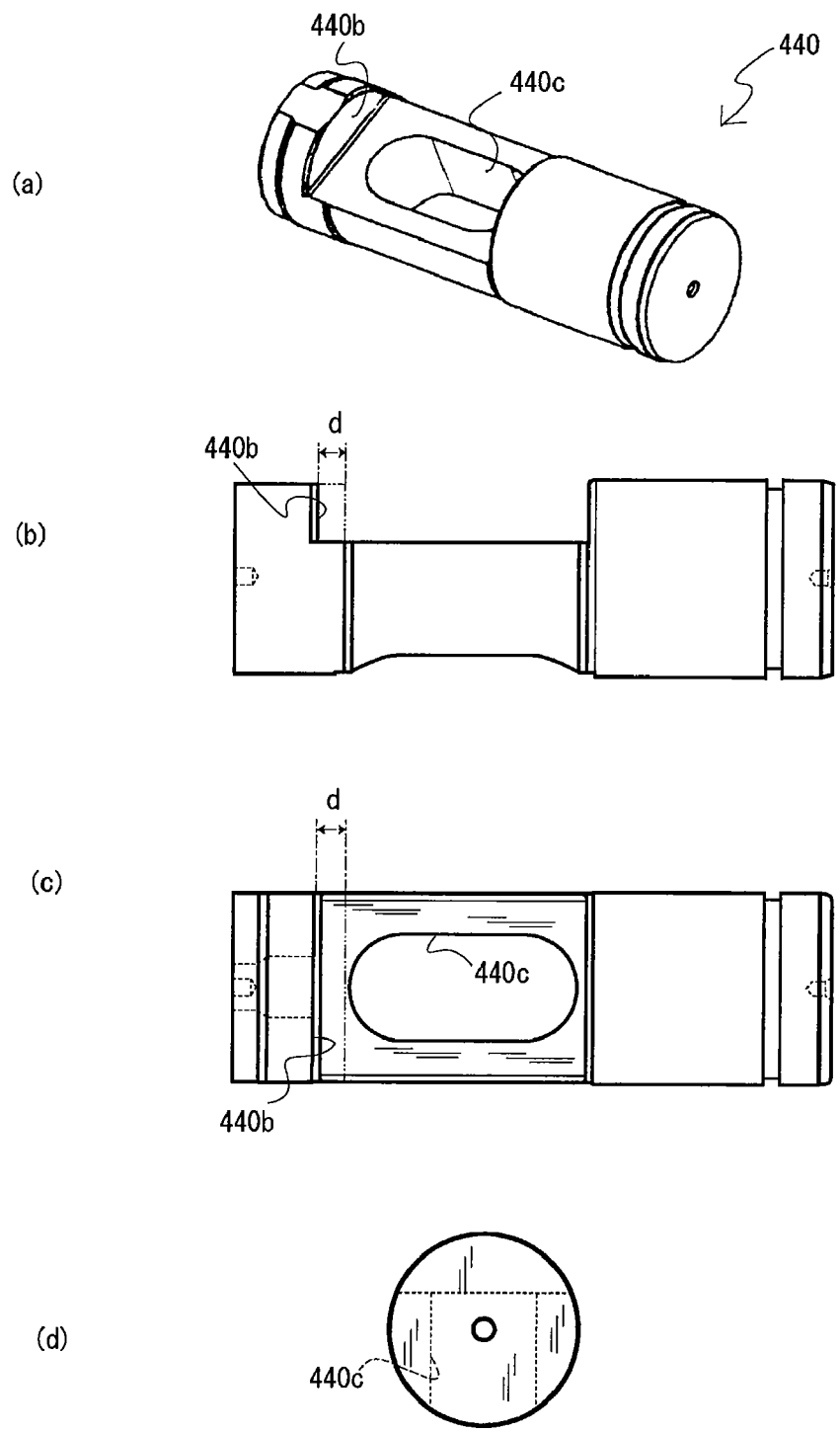
FIGS. 15(a) to 15(d) are drawings showing a large-diameter portion of the piston.

If a stroke of the piston 440 is 10, a stoke of the pin 27 is 13 and this difference of 3 in stroke is a movement amount d toward the delay side shown in FIG. 15. The O ring is mounted to the rear end portion of the piston 440 so that the hydraulic oil in the oil chamber 404c due to the movement of the piston 440 is supplied to the slow return valve 405 without leaking. This facilitates stabilization of behavior of the piston 440 by the throttle.

Next, a structure of the slow return valve will be described.

Figure 16:
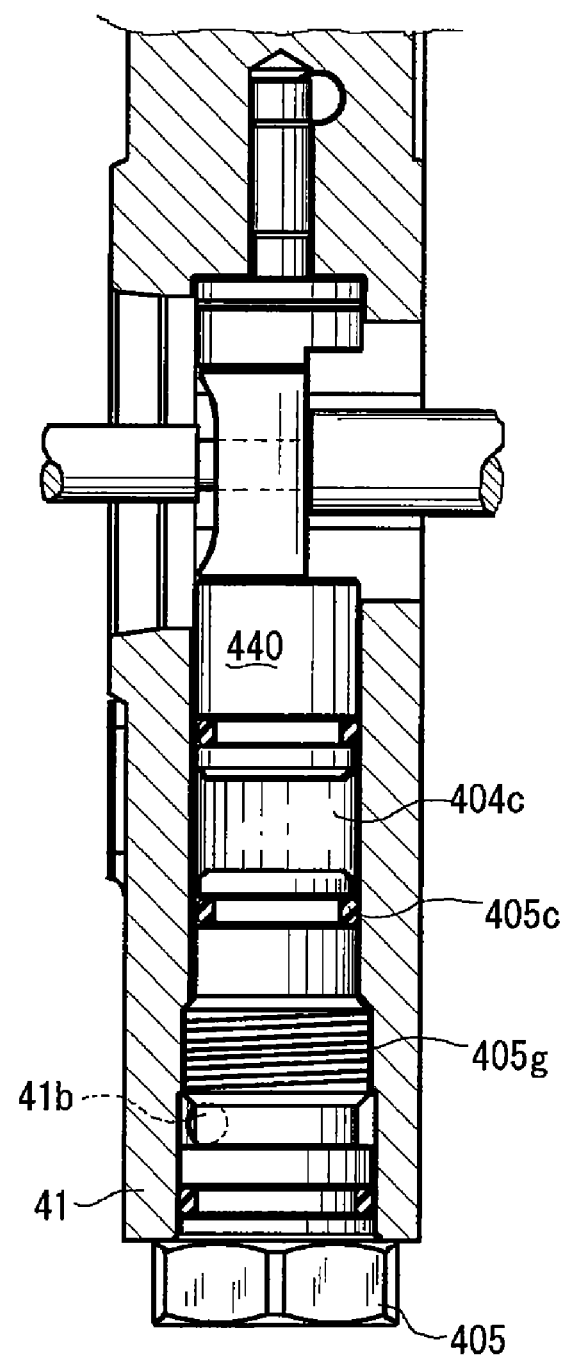
FIG. 16 is a drawing showing a mounted state of a slow return valve.
Figure 17:
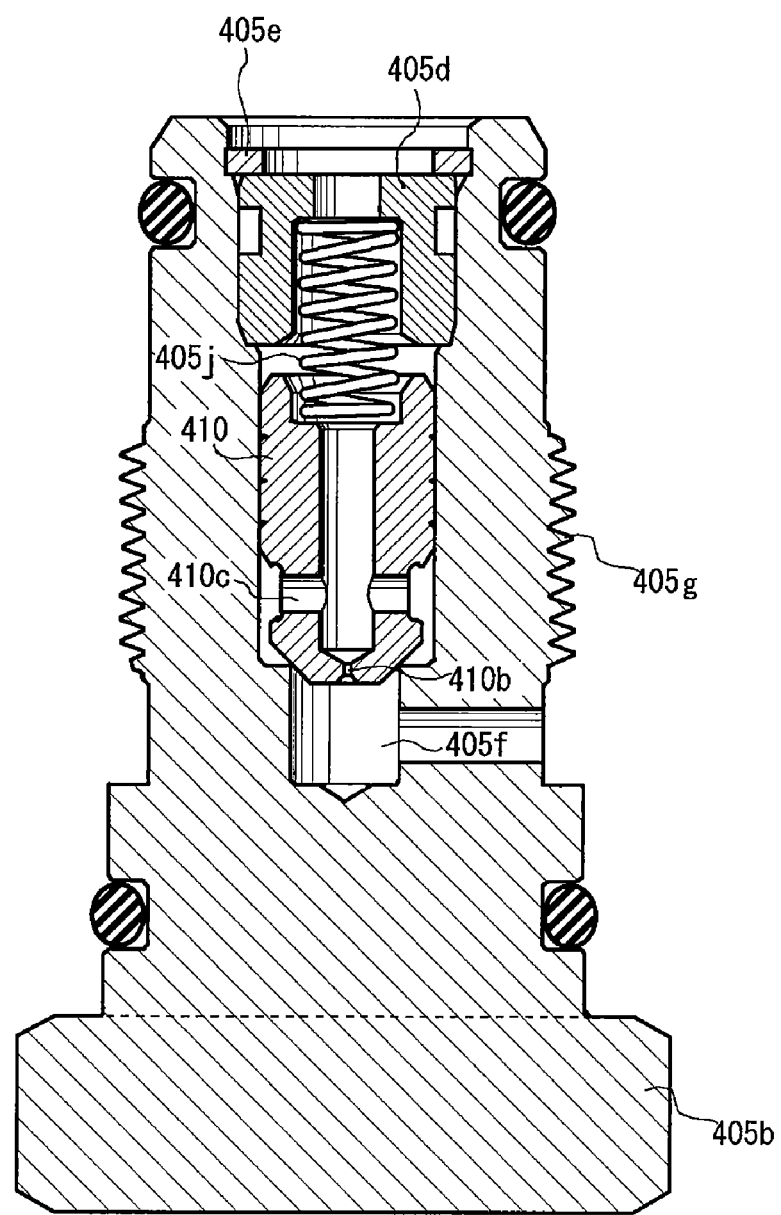
FIG. 17 is a side sectional view showing an inside of the slow return valve.

FIG. 16 is a drawing showing a mounted state of the slow return valve. FIG. 17 is a side sectional view showing an inside of the slow return valve.

The slow return valve 405 is formed with a thread groove 405g at a central portion and is mounted to the case 41 by screwing. An O ring 405c is mounted to a tip end portion of the slow return valve 405 and the hydraulic oil in the oil chamber 404c is supplied into the slow return valve 405 without leaking.

The slow return valve 405 is formed of a holder 405b, a slide valve 410, a spring 405j, a seat 405d, and a circlip 405e. The holder 405b is formed with an opening portion in an extending direction and the slide valve 410 is housed in the opening portion. The slide valve 410 is inserted into the holder 405b from its tip end and its rear end is biased by the spring 405j. The spring 405j is disposed between the slide valve 410 and the seat 405d and the seat 405d is fixed by the circlip 405e mounted to a tip end of the holder 405b.

The holder 405b is formed with an oil path 405f at a middle portion. The tip end of the slide valve 410 is formed with an orifice 410b that is a small-diameter oil path and a hole 410c is formed on a rear side of the orifice 410b. The slide valve 410 has an inner space open on a rear end side and the space, the orifice 410b, and the hole 410c fluidly communicate with each other. The tip end portion of the slide valve 410 is in contact with a seat face on the oil path 405f side and provided to the opening portion of the holder 405b in a natural state (i.e., a state in which pressure difference is not applied to the slow return valve 405).

The slide valve 410 is elongated in the sliding direction and can slide stably in the holder 405b.

Figure 18:
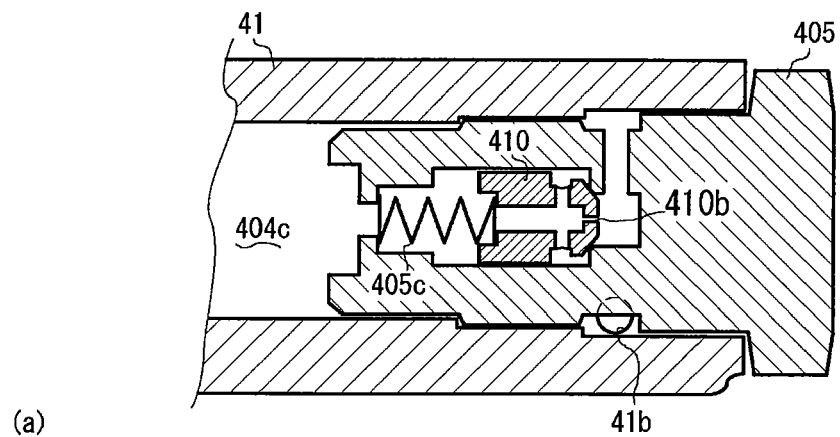
FIGS. 18(a) to 18(c) are schematic drawings showing an operational structure of the slow return valve.
Figure 18:
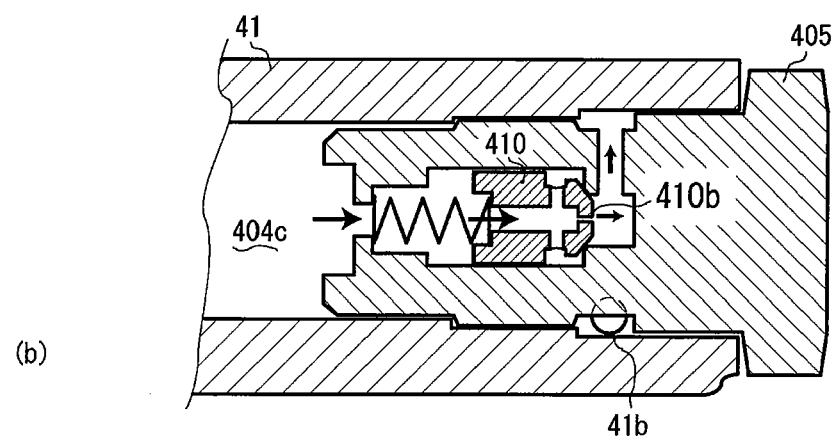
Figure 18:
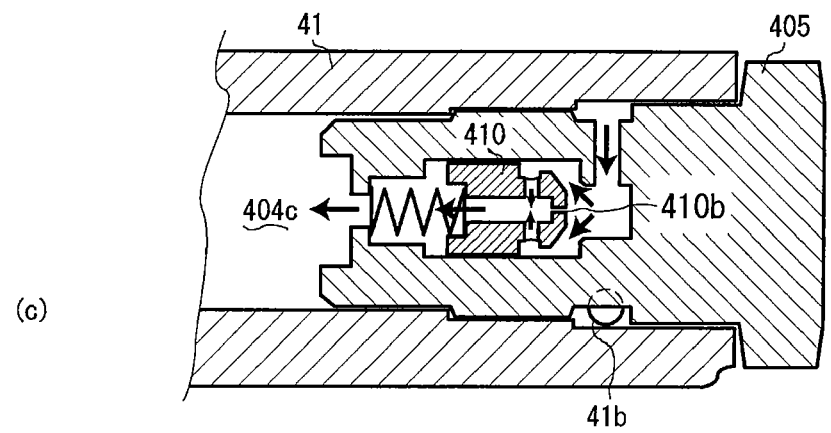
Figure 19:
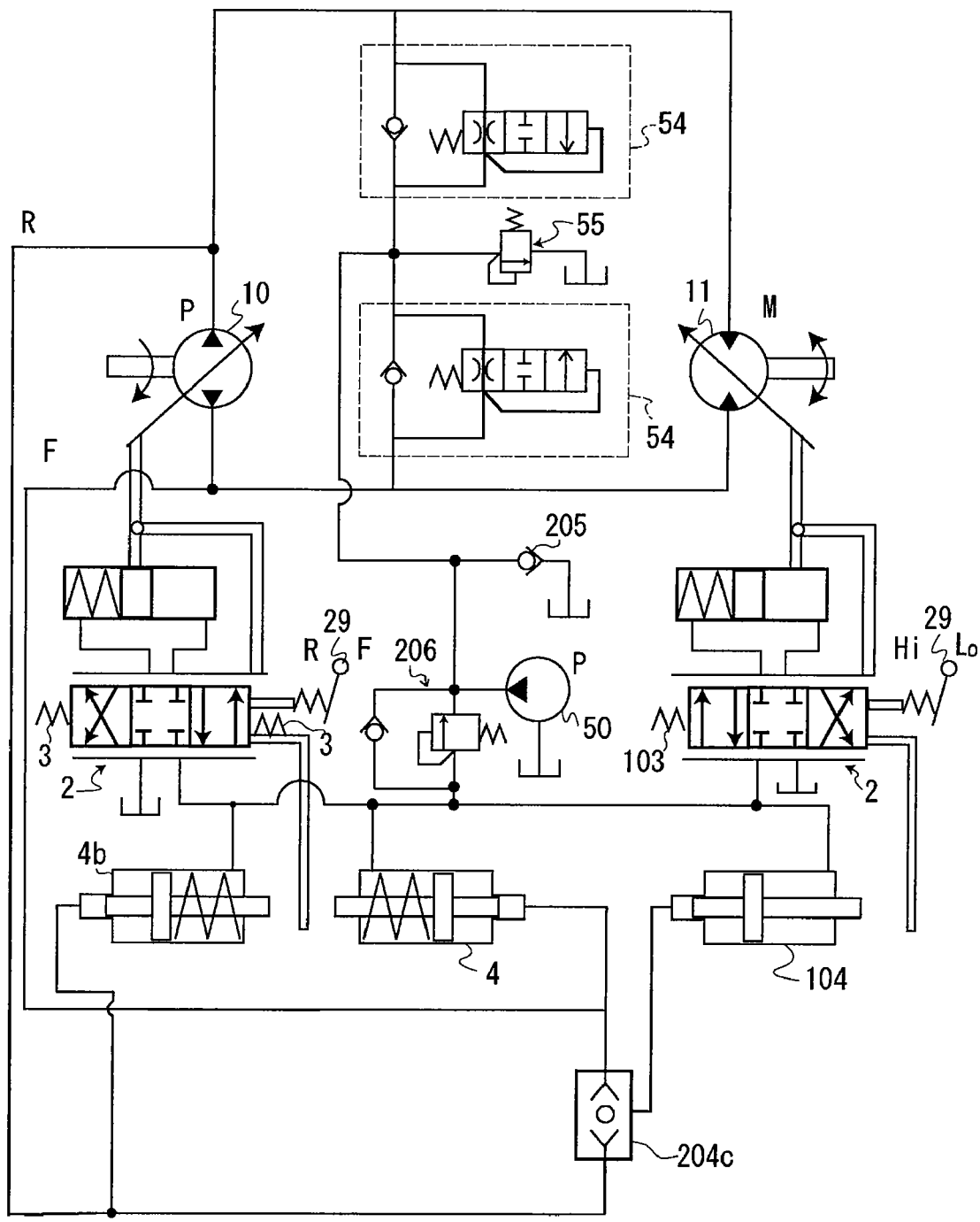
FIG. 19 is a hydraulic circuit of a prior-art hydraulic stepless transmission having a feedback circuit using a shuttle valve.

FIGS. 18(a) to 18(c) are schematic drawings showing an operational structure of the slow return valve. FIG. 18(a) is a drawing showing a state without pressure difference. FIG. 18(b) is a drawing showing a state in which the pressure is high on the tip end side. FIG. 18(c) is a drawing showing a state in which the pressure is high on the rear end side.

First, in the state without pressure difference between the oil chamber 404c and the oil path 41b as shown in FIG. 18(a), the hydraulic oil does not flow between the oil chamber 404c and the oil path 41b.

When the hydraulic pressure in the oil chamber 404c becomes high as shown in FIG. 18(b), the hydraulic oil flows out into the oil path 41b through the orifice 410b of the slide valve 410. In this case, the flow rate of the hydraulic oil is limited by the orifice 410b.

Furthermore, when the hydraulic pressure in the oil path 41b becomes high as shown in FIG. 18(c), the slide valve 410 moves toward the oil chamber 404c due to the movement of the hydraulic oil, and the hydraulic oil from the oil path 41b flows out into the oil chamber 404c through the hole 410c. In this case, the flow rate of the hydraulic oil is not limited.

As described above, the slow return valve 405 suppresses rapid operation in carrying out the load control in such a direction as to reduce the load on the motor 11 and therefore it is possible to carry out smooth load control.

INDUSTRIAL APPLICABILITY

The invention can be used for the hydraulic stepless transmission and can be used especially for the hydraulic stepless transmission in which swash plate angles of swash plates of the hydraulic pump and/or hydraulic motor forming the transmission are controlled.

The invention claimed is:

1. A hydraulic stepless transmission comprising:
    a variable displacement type hydraulic pump; and
    a variable displacement type hydraulic motor connected to the hydraulic pump by a hydraulic circuit,
    wherein the hydraulic pump includes:
        a first hydraulic servo mechanism for regulating swash plate angles of movable swash plates of the hydraulic pump to control output rotations of the respective hydraulic pump; and
        a first load control mechanism for both forward and reverse travel and for controlling the first hydraulic servo mechanism to a speed reducing side to turn the swash plate of the hydraulic pump in a speed reducing direction through the first hydraulic servo mechanism when pressure in the hydraulic circuit is high,
    wherein the hydraulic motor includes:
        a second hydraulic servo mechanism for regulating swash plate angles of movable swash plates of the hydraulic motor to control output rotations of the hydraulic motor; and
        a second load control mechanism for both forward and reverse travel and for controlling the second hydraulic servo mechanism to a speed reducing side to turn the swash plate of the hydraulic motor in a speed reducing direction through the second hydraulic servo mechanism when pressure in the hydraulic circuit is high, and
    wherein feedback pressures are introduced into each of the first and second load control mechanisms from a first portion of the hydraulic circuit that is a discharge side of the hydraulic pump in the forward travel and a second portion of the hydraulic circuit that is a discharge side of the hydraulic pump in backward travel.

2. The hydraulic stepless transmission according to claim 1, wherein a pressure regulating valve is provided between both of the first and second load control mechanisms and the first portion or between both of the first and second load control mechanisms and the second portion to make the feedback pressure from the first portion, and
    wherein the pressure regulating valve is mounted from outside the hydraulic stepless transmission and includes a pressure regulating member to be able to regulate set pressure.

3. The hydraulic stepless transmission according to claim 1, wherein the second load control mechanism included in the hydraulic motor includes:
    a piston;
    a first oil chamber which is on one side of the piston and into which the feedback pressure is introduced;
    a second oil chamber which is on the other side of the piston and into which back pressure is introduced; and
    a one-way throttle valve provided in an oil path communicating with the second oil chamber to throttle discharge of hydraulic oil from the second oil chamber.

4. The hydraulic stepless transmission according to claim 3, wherein the one-way throttle valve is of a cartridge type and the one-way throttle valve can be directly detached from outside the hydraulic stepless transmission.

* * * * *

UNITED STATES PATENT AND TRADEMARK OFFICE
CERTIFICATE OF CORRECTION

| | | |
|---|---|---|
| PATENT NO. | : 7,895,834 B2 | |
| APPLICATION NO. | : 12/066933 | |
| DATED | : March 1, 2011 | |
| INVENTOR(S) | : Kunihiko Sakamoto | |

It is certified that error appears in the above-identified patent and that said Letters Patent is hereby corrected as shown below:

In the Title Page, Item (56) References Cited section, Foreign Patent Documents replace "JP 60-14654" with --JP 60-14651--.

Signed and Sealed this
Thirty-first Day of May, 2011

David J. Kappos
*Director of the United States Patent and Trademark Office*